United States Patent
Sutter et al.

(10) Patent No.: US 12,409,944 B2
(45) Date of Patent: Sep. 9, 2025

(54) AERONAUTICAL CRYOGENIC TANK DEVICE FOR HYDROGEN STORAGE, FOR EXTERNAL TRANSPORTATION BY AN AIRCRAFT

(71) Applicant: ARESIA-VILLENEUVE, Villeneuve la Garenne (FR)

(72) Inventors: Xavier Sutter, Villeneuve la Garenne (FR); Jean-Christophe Bertolo, Villeneuve la Garenne (FR); Pascal Legrand, Villeneuve la Garenne (FR); Florin-Calin Paun, Villeneuve la Garenne (FR); Nicolas Walker, Villeneuve la Garenne (FR)

(73) Assignee: ARESIA-VILLENEUVE, Villeneuve la Garenne (FR)

( * ) Notice: Subject to any disclaimer, the term of this patent is extended or adjusted under 35 U.S.C. 154(b) by 0 days.

(21) Appl. No.: 18/846,733

(22) PCT Filed: Mar. 9, 2023

(86) PCT No.: PCT/FR2023/050320
§ 371 (c)(1),
(2) Date: Sep. 13, 2024

(87) PCT Pub. No.: WO2023/175260
PCT Pub. Date: Sep. 21, 2023

(65) Prior Publication Data
US 2025/0128824 A1    Apr. 24, 2025

(30) Foreign Application Priority Data

Mar. 14, 2022   (FR) ...................................... 2202234

(51) Int. Cl.
*F17C 7/04*    (2006.01)
*B64D 37/08*    (2006.01)
(Continued)

(52) U.S. Cl.
CPC ............. *B64D 37/08* (2013.01); *B64D 37/30* (2013.01); *F17C 5/00* (2013.01); *F17C 7/04* (2013.01);
(Continued)

(58) Field of Classification Search
CPC ................... F17C 2205/013; F17C 2205/0142
See application file for complete search history.

(56) References Cited

U.S. PATENT DOCUMENTS

2008/0256960 A1   10/2008  Greason
2010/0058780 A1*   3/2010  Yoo .......................... B63B 25/14
                                                                    62/53.2
(Continued)

FOREIGN PATENT DOCUMENTS

CN         104948303           9/2015
RU         2133696 C1           7/1999

OTHER PUBLICATIONS

International Patent Application No. PCT/FR2023/050320, filed Mar. 9, 2023; International Search Report / Written Opinion issued Jun. 30, 2023; 10 pages, English language translation included.

*Primary Examiner* — Paul J Gray
(74) *Attorney, Agent, or Firm* — Mueting Raasch Group

(57) ABSTRACT

Dismountable aeronautical pod device 30 with cryogenic storage capacity, for external transportation by an aircraft, comprising a front cryogenic tank 36, a rear cryogenic tank 37, and at least one central temporary storage tank for the rise in pressure of the gas supplied by the front cryogenic tank 36 and the rear cryogenic tank 37.

15 Claims, 2 Drawing Sheets

Figure 1:
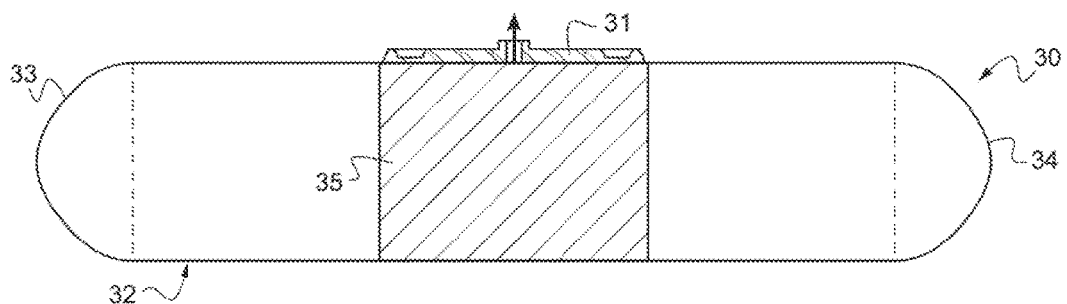

(51) Int. Cl.
*B64D 37/30* (2006.01)
*F17C 5/00* (2006.01)
(52) U.S. Cl.
CPC .............. *F17C 2201/0128* (2013.01); *F17C 2201/0133* (2013.01); *F17C 2205/013* (2013.01); *F17C 2225/033* (2013.01); *F17C 2225/036* (2013.01); *F17C 2270/0189* (2013.01)

(56) References Cited

U.S. PATENT DOCUMENTS

2016/0039521 A1 2/2016 London
2022/0307649 A1* 9/2022 Benninger ............... C08K 3/22

* cited by examiner

AERONAUTICAL CRYOGENIC TANK DEVICE FOR HYDROGEN STORAGE, FOR EXTERNAL TRANSPORTATION BY AN AIRCRAFT

This application is the § 371 U.S. National Stage of International Application No. PCT/FR2023/050320, filed Mar. 9, 2023, which claims the priority to French Patent Application No. FR2202234, filed Mar. 14, 2022.

The present invention relates to the aeronautical industry.

Since its inception, the aeronautical industry has used high-octane petrol engines. After 1945, the development of the jet engine and turbine led to the use of kerosene, which has a higher molecular weight than petrol, higher energy density, higher efficiency and lower flammability. These fuels are generally stored in tanks located in the wings, in the fuselage-wing link or in the tail.

The trend towards reducing carbon dioxide emissions has led to engines that consume less fuel. However, the gains in carbon dioxide emissions are diminishing as certain technologies mature, in particular the speed of the blade tips. It became increasingly desirable to make a break with the past.

This led to the development of gas-powered aircraft. Combustion of gases with a short or non-existent carbon chain, with oxygen where appropriate, results in little or no pollution. On the other hand, the storage of H2, O2 or C1 or C2 gases, due to the small size of the gas molecule, is difficult and liable to leaks.

On the ground, such gases are generally stored in pressurised casings that are too heavy, too bulky and contain too much potential pressure energy to be carried on board an aircraft, or in welded and/or bonded cryogenic tanks. Cryopreservation of such gases is limited to a limited duration proportional to the stored volume.

Furthermore, hydrogen, methane, ethane, ethylene, acetylene or oxygen stored in liquid state cannot be used by an internal or external combustion engine or a fuel cell. Final consumption requires a gaseous state.

The need has arisen to store propulsion gas within an aircraft for on-board consumption, while applying aeronautical maintenance know-how and avoiding the need for new standardisation. Indeed, establishing new standards is a long, time-consuming process which risks delaying bringing gas-powered aircraft to market. Acquiring new maintenance know-how is also lengthy and costly, and can even lead to resistance.

The invention proposes a dismountable aeronautical pod device with cryogenic storage capacity, for external transportation by an aircraft, comprising a front cryogenic tank, a rear cryogenic tank, at least one central temporary storage tank for the rise in pressure of the gas supplied by the front cryogenic tank and the rear cryogenic tank. Thanks to the invention, the device can have an elongated shape enabling it to be mounted in or on the aircraft with a high ratio of stored energy to device size. Storage and gasification take place separately and near one another. Dismountable means that the pod device can be mounted on and removed from an aircraft very quickly, on an airport runway, with or if possible without tools. It is advantageous that mounting is of the "plug and play" type.

Unlike aerospace where parts are used once for a duration of a few seconds or tens of seconds, the aeronautical industry requires parts with a long life of several tens of thousands of hours and several tens of thousands of cycles.

In one embodiment, each cryogenic tank, both the front and rear, has a convex outer shape, and comprises an inner casing defining a storage chamber, an outer casing containing the inner casing, an isolation chamber defined between the inner casing and the outer casing, and a removable manifold passing through the outer casing and the inner casing in a sealed manner, and a pipe fed by the manifold, and the central temporary storage tank having a quasi-toric or quasi-annular shape. The use of available space is improved.

In one embodiment, each cryogenic tank is super-insulated under vacuum against conduction, convection and radiation. Natural evaporation is reduced.

In one embodiment, the device is provided with a front cryogenic tank and a rear cryogenic tank, in an elongated shape along a common axis. An elongated outer shape of the device can be obtained.

In one embodiment, the device comprises at least two front cryogenic tanks and at least two rear cryogenic tanks, which are spherical in shape. The use of available space is improved for a contained mass.

In one embodiment, the device comprises a plurality of temporary storage tanks each arranged between two cryogenic tanks. The temporary storage capacity is increased.

In one embodiment, the central temporary storage tank forms a gasification member, an upstream valve being provided to be open for liquid to flow through during a filling phase of the central temporary storage tank and closed outside of the filling phase, a downstream valve being provided to be open for gas to flow through during an emptying phase of the central temporary storage tank and closed outside the emptying phase, the upstream valve and the downstream valve being closed during a gasification phase. The system ensures that the volume contained in the temporary tank(s) gives the aircraft the autonomy it needs, regardless of the state of the cryogenic tanks. The temporary tanks can be designed for a gas pressure of several hundred bar, although a selected gas pressure is supplied to the consumer members.

In one embodiment, the upstream valve and the downstream valve are controlled in a on-off manner. The valves are reliable.

In one embodiment, the device comprises a compressor arranged downstream of the downstream valve, said compressor being active at the end of the emptying phase to bring the pressure in the central temporary storage tank to a value lower than the lowest value of the pressure in the front cryogenic tank and in the rear cryogenic tank, and a pressure regulator arranged downstream of the downstream valve, said pressure regulator being active at the start of the emptying phase to bring the pressure of the gas at the outlet to a value lower than the pressure in the central temporary storage tank. The temporary tank can be emptied sufficiently so as to increase the amount of gas available for the consumer members and bring the temporary tank to a pressure at the end of emptying that is lower than the current pressure in the cryogenic tank designated at that time for filling. The temporary tank is filled by operating a cryogenic valve under the effect of the pressure difference. Dispensing with a cryogenic pump saves weight and reduces the risk of an incident.

In one embodiment, each of the cryogenic tanks is designed for an operating pressure of less than 8 bars and the central temporary storage tank is designed for an operating pressure of more than 500 bars. The cryogenic tanks have a reduced empty weight.

Other features and advantages of the invention will become apparent upon reading the detailed description below, and from the appended drawings, in which:

FIG. 1 schematically shows an elevation side view of an aeronautical cryogenic tank device according to one aspect of the invention.

Figure 2:
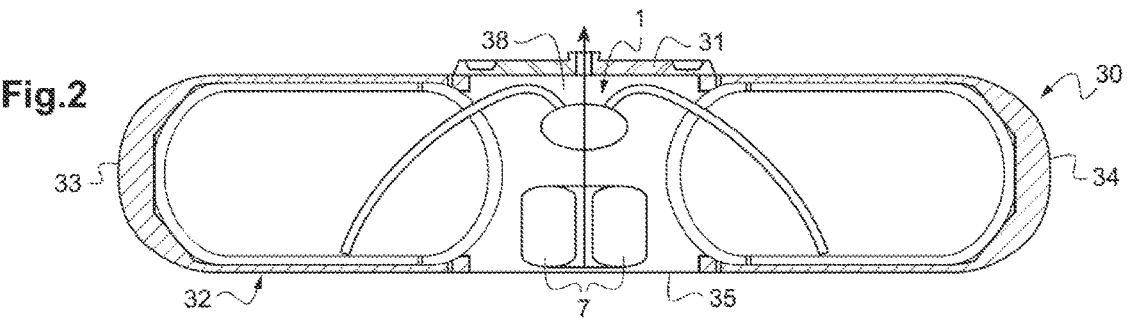

FIG. 2 schematically shows a longitudinal section of an aeronautical cryogenic tank device according to one aspect of the invention.

Figure 3:
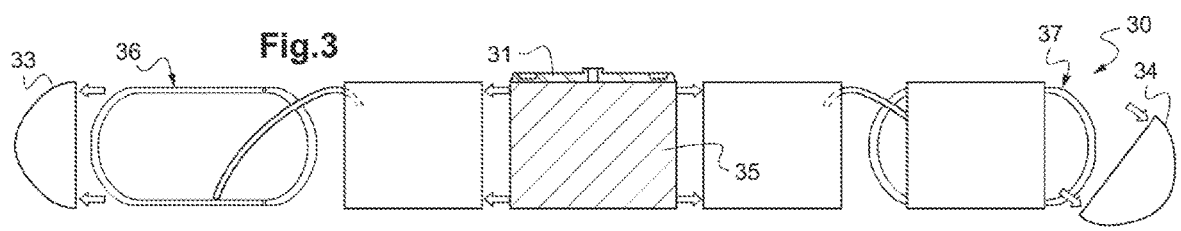

FIG. 3 schematically shows an exploded view of an aeronautical cryogenic tank device according to one aspect of the invention.

Figure 4:
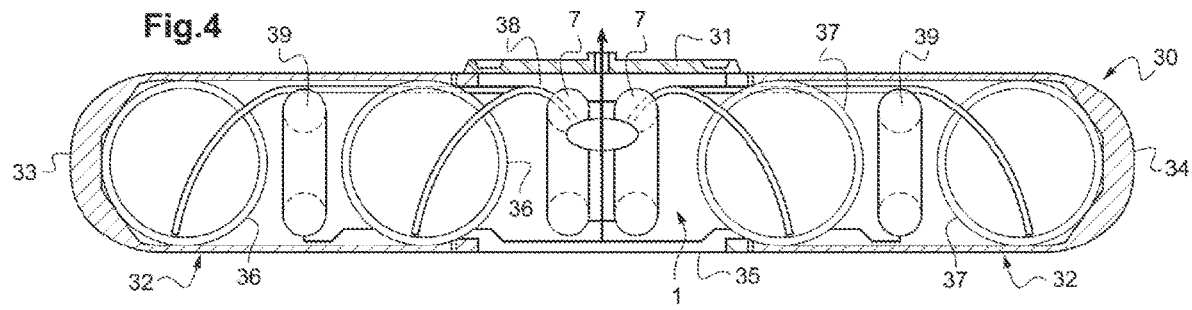

FIG. 4 schematically shows a longitudinal section of an aeronautical cryogenic tank device according to another aspect of the invention.

Figure 5:
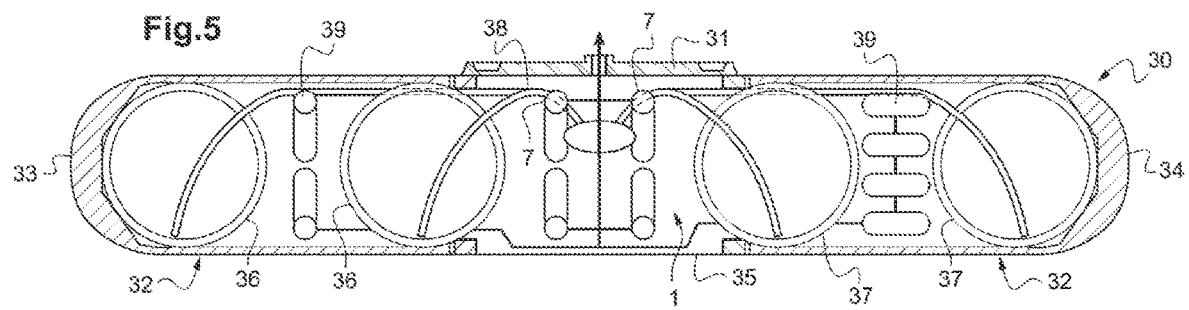

FIG. 5 schematically shows a longitudinal section of an aeronautical cryogenic tank device according to another aspect of the invention.

Figure 6:
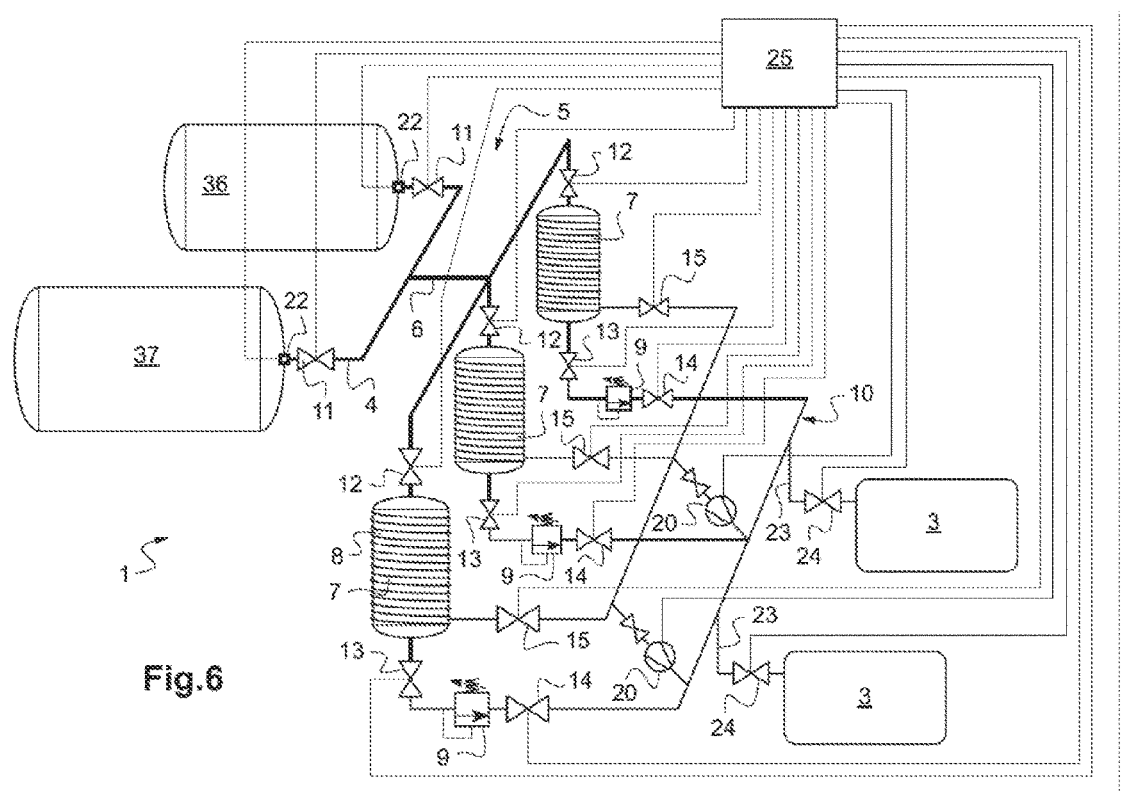

FIG. 6 schematically shows a distribution circuit according to one aspect of the invention.

The appended drawings may serve not only to complete the invention, but also to contribute to its definition, where appropriate.

The aeronautical gas storage device is designed to be transported by an aircraft: plane, drone, helicopter, etc. . . . The aeronautical gas storage device contains liquid and supplies gas. In other words, the gas is stored at a very low temperature in liquid form in a cryogenic tank. A cryogenic tank is unable to withstand high pressures, in particular greater than 10 bars.

Furthermore, the gas stored in liquid state cannot be used by an internal or external combustion engine or a fuel cell. Final consumption requires gas in a temperature range and pressure range specified by the manufacturer of the consumer member.

The stored gas is chosen from hydrogen, methane, ethane, ethylene, acetylene and oxygen.

The applicant also intends to take into account that gasification is a rapid phenomenon even in an ambient atmosphere at −55° C. found at altitude. By way of example, gaseous hydrogen at 0° C. and 1 atmosphere has a density approximately 800 times lower than liquid hydrogen at −253° C., and therefore a volume approximately 800 times greater.

Furthermore, the rules of aeronautical maintenance require that most parts of the aircraft can be removed and repaired or replaced. In this way, an aircraft is able to land in any place—an aerodrome for a plane, a landing area for a helicopter—adapted to its weight and its landing requirements but not provided with maintenance equipment specific to the model of the aircraft. If damage is detected, the aircraft is designed to be repaired, either permanently or temporarily, or disassembled so as to replace or repair a faulty component, in line with the manufacturer's manuals and documents approved by the aviation safety authorities. It is desirable for the component to be readily accessible to a maintenance operator. If it is to be replaced, it is desirable for the component to be as small as possible for easy handling and transport. If it is to be repaired, it is desirable that the component can be repaired by tried-and-tested tools and methods commonly used in the aeronautical industry.

An aircraft undergoes daily, weekly, etc. inspections, grounding the aircraft for a duration inversely proportional to the frequency.

The applicant has identified a storage need, in particular for hydrogen, methane, ethane, ethylene, acetylene or oxygen, using aeronautical cryogenic tanks carried by the aircraft.

From another point of view, planes are currently subject to a rule stipulating maximum distance from a runway according to ETOPS certification. This distance depends on the type of plane.

Wishing to provide a high level of safety as well as for this safety to be noticed by users, the applicant has identified the need to fly even in the event of damage to the cryogenic tank requiring the contained gas to be released into the atmosphere.

The aeronautical storage pod device 30 aims to meet the complex need analysed in this way by the applicant.

The aeronautical cryogenic storage pod device 30 is designed to be transported by an aircraft. The aeronautical storage pod device 30 is filled with liquid and supplies gas at a selected pressure. In other words, the fuel or oxidiser is stored at a very low temperature in liquid form in a cryogenic tank. A cryogenic tank is unable to withstand high pressures, in particular greater than 10 bars.

The aeronautical storage device 30 is in the form of a pod. The aeronautical storage device 30 is fitted with a mechanism 31 for quick attachment to an aircraft wing.

In the embodiment shown in FIGS. 1 to 3, the aeronautical cryogenic tank storage device 30 has an elongated shape. The aeronautical cryogenic tank storage device 30 comprises a central body 32, a front end 33 and a rear end 34. The front end 33 and the rear end 34 comprise shells to ensure an aerodynamic shape. The central body 32 comprises one or more generally cylindrical sections. In this case, three sections are provided, a central section 35, a front section and a rear section. The shells and the section(s) of the central body can be removed. The shells and the section(s) of the main body provide mechanical protection against impacts, in particular bird strikes at the front end and handling shocks.

The attachment mechanism 31 is a quick-fit/disassembly mechanism enabling the aeronautical cryogenic tank device 30 to be fitted to the aircraft in a short time, in particular a few minutes or tens of minutes, at the same time as other operations carried out on the runway. Said short time is less than the minimum turnaround time. The attachment mechanism 31 is provided substantially in the middle of the length of the aeronautical cryogenic tank device 30 or substantially close longitudinally to the centre of gravity of the aeronautical cryogenic tank device 30. In this case, the attachment mechanism 31 is integral with the central section 35 of the central body. The attachment mechanism 31 comprises a gas line quick coupling. The central section 35 supports the front and rear sections. The front and rear sections support the front and rear ends respectively.

As shown in FIG. 1, the central body 32, the front end 33 and the rear end 34 have outer surfaces adapted to the flow of air at the speed of travel of the aircraft, in particular aerodynamic surfaces. Said outer surfaces form a fairing. Joints can be provided between the central body 32 and the front end 33, on the one hand, and between the central body 32 and the rear end 34, on the other. Vents are arranged in the central body 32, the front end 33 and/or the rear end 34 for pressure balance and ventilation. Condensation and icing are prevented.

The central body 32 provides support for the members arranged inside it and at its ends. The central body 32 can comprise at least one layer of shock-absorbing and vibration-absorbing material. The central body 32 acts as a shock-absorber limiting the stress on the attachment mechanism 31 and on the other members of the device described below. The central body 32 forms a self-supporting fairing.

The aeronautical cryogenic tank device 30 comprises a front cryogenic tank 36 and a rear cryogenic tank 37. The central section 35 supports the front cryogenic tank 36 and a rear cryogenic tank 37.

The front cryogenic tank 36 and a rear cryogenic tank 37 are mounted inside sections of the central body 32. The front cryogenic tank 36 and the rear cryogenic tank 37 can have slightly different shapes in order to optimise the use of available space, whilst having a generally similar design. The front cryogenic tank and the rear cryogenic tanks are mounted head-to-tail. The front cryogenic tank 36 and the rear cryogenic tank 37 are shown here aligned along a longitudinal axis, this feature being optional.

The front cryogenic tank 36 and the rear cryogenic tank 37 can have an elongated shape around a common axis or two axes. The front cryogenic tank 36 and the rear cryogenic tank 37 can have a curved front, a curved rear and a rotationally cylindrical central part.

The front section substantially covers the front cryogenic tank 36. The rear section substantially covers the rear cryogenic tank 37. The central section 35 substantially covers the rear end of the front cryogenic tank 36, the front end of the rear cryogenic tank 37 and a central space 38. The central space 38 is generally ring-shaped. The central space 38 is at ambient pressure. The central space 38 is ventilated.

The aeronautical cryogenic tank storage device 30 comprises at least one central temporary storage tank 7. In this case, two central temporary storage tanks 7 are shown. The central temporary storage tanks 7 are mounted in parallel. The central temporary storage tanks 7 are managed by a distribution and conditioning circuit 1 shown in FIG. 6. The central temporary storage tanks 7 are alternatively filled with liquid coming from at least one of the cryogenic tanks 36 and 37 and, after gasification, emptied of the gas that they contain. The central temporary storage tanks 7 operate alternately, one filling, the other emptying and vice versa most of the operating time. It can be provided to take off with the two central temporary storage tanks 7 full.

Each central temporary storage tank 7 forms a gasifier. Each central temporary storage tank 7 forms a heat exchanger. Each central temporary storage tank 7 comprises at least one cryogenic liquid inlet and at least one gas outlet. The central temporary storage tanks 7 do not have any thermal insulation. The central temporary storage tanks 7 comprise a simple casing. The central temporary storage tanks 7 are metallic and/or made of composite materials. The central temporary storage tanks 7 are made entirely or partly of conductive material. The central temporary storage tanks 7 withstand cryogenic temperatures. The central temporary storage tanks 7 withstand high operating pressures compared with the low-pressure front 36 and rear 37 cryogenic tanks. The central temporary storage tanks 7 have a short storage life compared to the front 36 and rear 37 cryogenic tanks which have a long storage life.

The central temporary storage tanks 7 are mounted in the central space, in this case opposite the quick attachment mechanism. In the embodiment shown in FIG. 2, the central temporary storage tanks 7 have a cylindrical shape with a vertical axis and rounded ends.

As the central space 38 is compact, the liquid lines and gas lines have a limited length. The weight of the device is optimised.

In the embodiment shown in FIG. 4, the aeronautical cryogenic tank comprises two front cryogenic tanks 36 and two rear cryogenic tanks 37. The front cryogenic tanks 36 and the rear cryogenic tanks 37 have a spherical shape. The front cryogenic tanks 36 and the rear cryogenic tanks 37 are shown here aligned, this feature being optional. The central temporary storage tanks 7 have an annular, in particular toric shape. In addition, additional temporary storage tanks 39 are arranged between the front cryogenic tanks 36 and between the rear cryogenic tanks 37. The additional cryogenic tanks 39 have an annular, in particular toric shape.

Each cryogenic tank is insulated to contain liquid fuel or oxidiser at −253° C. Each cryogenic tank is able to withstand a maximum operating pressure of the order of 6 to 10 bars.

In the embodiment shown in FIG. 5, the additional buffer tanks 39 between the front cryogenic tanks 36 are arranged in the shape of a regular polygon. Each additional cryogenic tank 39 has a cylindrical body and rounded ends. The axes of the bodies of the additional buffer tanks 39 define a hexagon here.

The additional buffer tanks 39 between the rear cryogenic tanks 37 are arranged in parallel. Each additional cryogenic tank 39 has a cylindrical body and rounded ends. The axis of the device and the axes of the additional buffer tanks 39 are parallel. In a cross-sectional view, the axes of the bodies of the additional buffer tanks 39 define the vertices of a regular polygon. The additional buffer tanks 39 are arranged like the chambers of a barrel.

FIG. 5 shows two embodiments at the same time, the polygonal embodiment in the front and the parallel embodiment in the rear, grouped together for the sake of concision. In practice, a device has only one of these embodiments with either all of the additional buffer tanks 39 as a polygon, or all of the additional buffer tanks 39 in parallel. In the two embodiments, the design of the additional buffer tanks 39 is very robust owing to their shape adapted to high pressures and manufacturing constraints.

In one embodiment, at least one additional cryogenic tank 39 is provided with a cylindrical body and rounded ends.

The gas distribution circuit

The distribution circuit 1 is explained with reference to FIG. 6.

The aircraft distribution circuit 1 is fed by the cryogenic tanks 36, 37 to supply gas to one or more consumer members of the aircraft. A flowmeter 22 is arranged at the outlet of each cryogenic tank 2.

Each cryogenic tank is fitted with an outlet pipe 4. The terms upstream and downstream refer to the direction of flow of the fluid, liquid or gas during normal operation.

The distribution circuit 1 comprises a first valve 11 for each cryogenic tank. The first valve 11 is mounted on the outlet pipe 4. The first valves 11 are controlled with an open position and a closed position. The intermediate positions of the first valves 11 are dynamic in the sense that the first valves 11 move as they pass through said intermediate positions. In other words, the first valves 11 are on-off. The first valves 11 can be arranged immediately downstream of the flowmeters 22.

The first valves 11 open into a cryogenic distributor 5. The cryogenic distributor 5 can comprise a common pipe 6 connecting the outlets of the first valves 11. The distributor is cryogenic in the sense that liquid fuel/oxidiser passes through it.

The cryogenic distributor 5 comprises a plurality of outlets, in this case three. Second valves 12 are mounted on each of said outlets. The second valves 12 are controlled with an open position and a closed position. The intermediate positions of the second valves 12 are dynamic in the sense that the second valves 12 move as they pass through said intermediate positions. In other words, the second valves 12 are on-off. There are three second valves 12 in this case.

A central tank 7 is mounted downstream of each second valve 12. Three central tanks 7 are provided in this embodiment. Each central tank 7 also serves as a gasifier. Insulation can be prevented. Each central tank 7 receives liquid and supplies gas downstream. A pressure rise or gasification step takes place in each central tank 7 between filling and emptying. Each central tank 7 is able to withstand a maximum operating pressure of the order of 300 to 1000 bars. Each central tank 7 is designed to operate in a temperature range of −253° C. to +60° C. The central tanks 7 are two-phase for some of the operating steps and single-phase gas for the other operating steps. Each central tank 7 can be fitted with a heater 8.

Downstream of each central tank 7 is a third valve 13 for supplying gas and a pressure regulator 9 downstream of the third valve 13. The pressure regulator 9 reduces the pressure to supply gas at a consumption pressure set by the manufacturer of the consumer member 3. The pressure regulator 9 is active when the pressure in the central tank 7 is greater than the consumption pressure and inactive otherwise. The consumption pressure is lower than the maximum pressure of the central tank 7. The consumption pressure is independent of the maximum pressure of the cryogenic tanks. The third valves 13 are on-off.

A fourth controlled valve 14 can be provided downstream of each pressure regulator 9. The fourth valves 14 are on-off.

The fourth valves 14 or the pressure regulators 9, depending on the chosen option, open into a manifold 10. The manifold 10 can comprise a pipe connecting the outlets of the fourth valves 14 or pressure regulators 9. Gas flows through the manifold 10. The manifold 10 is connected downstream to supply lines 23 to the consumer members 3. In general, a supply line 23 is provided for each consumer member 3. Each supply line 23 can be fitted with a controlled supply valve 24. The supply valve 24 has a variable flow rate.

The distribution circuit 1 comprises at least one compressor 20 connected to the manifold 10. In general, two compressors 20 are provided in parallel for redundancy. The compressor 20 is electric. The compressor 20 can be fitted with a controlled upstream valve. The compressor 20 delivers gas to the manifold 10. In particular, the manifold 10 is composed of a pipe if there is a single consumer member 3.

Downstream of each central tank 7 is a fifth valve 15 for supplying gas and a second manifold downstream of the fifth valves 15. The second manifold is connected to the compressor 20. The fifth valves 15 isolate the central tanks 7 and the compressor 20. The fifth valves 15 are controlled. The fifth valves 15 are on-off.

The compressor 20 increases the pressure to supply gas at a pressure equal to a consumption pressure set by the manufacturer of the consumer member 3. The consumption pressure is lower than the maximum pressure in the central tank 7. The compressor 20 enables gas to be taken from a central tank 7, the pressure of which is lower than the consumption pressure, to supply the manifold 10 and the consumer members 3. More complete emptying of the central tank 7 increases the autonomy provided by the gas contained in the central tank 7 or reduces the volume of the central tank 7.

Sufficient emptying of the central tank 7 to bring the internal pressure of the central tank 7 to a value lower than the pressure in one of the cryogenic tanks makes it possible to transfer the liquid from the cryogenic tank to the central tank 7 by pressure difference during filling that follows emptying. Thus, the liquid in the cryogenic tank is drawn into the central tank 7 until pressure equilibrium is reached. A cryogenic pump can be dispensed with, which results in weight savings and a reduction in energy consumption.

The distribution circuit 1 offers a combination of individual states for each cryogenic tank, for each central tank 7 and for each consumer member 3. Several consumer members 3 can be active at the same time. In normal mode, one cryogenic tank is being emptied whilst the others are inactive and therefore closed. However, in certain situations, for example in order to reduce the pressure in several cryogenic tanks, one particular embodiment can be provided in which several cryogenic tanks are being emptied. The central tanks 7 have a filling mode, a gasification mode, a gas storage mode and an emptying mode.

When one of the cryogenic tanks is being emptied, the first corresponding valve 11 is open and the other first valves 11 are closed. When one of the consumer members 3 is being supplied, the corresponding supply valve 24 is open.

When one of the central tanks 7 is in filling mode, the second valve 12 connected to said central tank 7 is open and at least one of the first valves 11 is open. The other second valves 12 are closed expected in the event that two central tanks 7 are being filled simultaneously. The third valve 13 connected to said central tank 7 is closed. The fifth valve connected to said central tank 7 is closed.

When one of the central tanks 7 is in gasification mode, the second valve 12 connected to said central tank 7, the third valve 13 connected to said central tank 7 and the fifth valve 15 connected to said central tank 7 are closed. The gasification mode is brief, in particular when the ambient atmosphere is warm and/or the central tank 7 is heated.

When one of the central tanks 7 is in emptying mode, the second valve 12 connected to said central tank 7 is closed. In the first emptying part, the pressure in the central tank 7 is greater than the consumption pressure. The third valve 13 connected to said central tank 7 is open, the fourth corresponding valve 14 is open and the fifth valve connected to said central tank 7 is closed. The gas undergoes a reduction in pressure in the pressure regulator 9 and is supplied to the manifold 10 at the consumption pressure. The gas is then consumed by the consumer member(s) 3.

At any given moment, out of the three central tanks 7, one is in filling mode, another is in gasification then storage mode and the third is in emptying mode. As the modes have different durations, it is also possible to find two central tanks 7 in filling mode and the third in emptying mode or vice versa. It is also possible to find two central tanks 7 in storage mode and the third in emptying mode or vice versa.

In the embodiment, a flowmeter 22 is arranged at the outlet of each liquid fuel/oxidiser source 2. The flowmeters 22 provide sufficiently accurate information on the amount of liquid supplied to such a central tank 7.

In the embodiment, the distribution circuit 1 comprises a control unit 25 receiving an external command, for example from the consumer units 3 outside of the aeronautical storage device or from a central control unit of the aircraft, and liquid flow data from the flowmeters 22. The control unit 25 generates and sends commands to said first, second, third, fourth and fifth controlled valves and to the controlled supply valves 24. The commands can be "open" or "closed". The control unit 25 manages said combination of individual states.

Alternatively, the first valves 11 can be replaced by at least one multi-way valve having a plurality of inlets and one outlet. In this case, it is advantageous to provide a multi-way valve with mixed positions, in particular at least one position for simultaneously emptying two or more cryogenic tanks 2 to reduce the pressure while preventing loss into the atmosphere.

Alternatively, the second valves 12 can be replaced by at least one multi-way valve having one inlet and a plurality of outlets, one for each central tank 7. Said multi-way valve forms a distributor.

Alternatively, the pressure regulators 9 are replaced by a single pressure regulator 9, the third valves 13 opening to the single pressure regulator 9. In this case, the third valves 13 can be replaced by at least one multi-way valve having a plurality of inlets and one outlet to the pressure regulator. The fourth valves 14 are therefore replaced by a single fourth valve 14, where appropriate not controlled.

Alternatively, the fifth valves 15 can be replaced by at least one multi-way valve having a plurality of inlets, one for each central tank 7, and one outlet to the compressor 20 or compressors 20. Said multi-way valve forms a manifold 10.

As the cryogenic tanks 2 are subject to evaporation from the liquid, a gas collection circuit can be provided in an upper part of the cryogenic tanks 2. The collection circuit can be activated above a threshold pressure by a calibrated pressure valve. The collection circuit comprises a compressor to re-inject the gas downstream, for example between the fifth valves 15 and the compressor 20.

Optionally, additional flowmeters are arranged at the inlet of each buffer tank. Liquid flow measurement redundancy is provided.

The invention claimed is:

1. A dismountable aeronautical pod device with cryogenic storage capacity, for external transportation by an aircraft, comprising a front cryogenic tank, a rear cryogenic tank, at least one central gasification and temporary storage tank for a rise in pressure of gas supplied by the front cryogenic tank and the rear cryogenic tank, each cryogenic tank, both the front and rear, has a convex outer shape, and comprises an inner casing defining a storage chamber, an outer casing containing the inner casing, an isolation chamber defined between the inner casing and the outer casing, and a removable manifold passing through the outer casing and the inner casing in a sealed manner, and a pipe fed by the manifold, and the temporary storage tank having a quasi-toric or quasi-annular shape.

2. The device according to claim 1, wherein each cryogenic tank is super-insulated under vacuum against conduction, convection and radiation.

3. The device according to claim 1, provided with the front cryogenic tank and the rear cryogenic tank, in an elongated shape along a common axis.

4. The device according to claim 1, comprising at least two front cryogenic tanks and at least two rear cryogenic tanks, which are spherical in shape.

5. The device according to claim 1, comprising a plurality of temporary storage tanks each arranged between two cryogenic tanks.

6. The device according to claim 1, wherein the temporary storage tank forms a gasification member, an upstream valve being provided to be open for liquid to flow through during a filling phase of the temporary storage tank and closed outside of the filling phase, a downstream valve being provided to be open for gas to flow through during an emptying phase of the temporary storage tank and closed outside the emptying phase, the upstream valve and the downstream valve being closed during a gasification phase.

7. The device according to claim 6, wherein the upstream valve and the downstream valve are controlled in an on-off manner.

8. The device according to claim 1, wherein each of the cryogenic tanks is designed for an operating pressure of less than 8 bars and the temporary storage tank is designed for an operating pressure of more than 500 bars.

9. A dismountable aeronautical pod device with cryogenic storage capacity, for external transportation by an aircraft, comprising a front cryogenic tank, a rear cryogenic tank, at least one central gasification and temporary storage tank for a rise in pressure of gas supplied by the front cryogenic tank and the rear cryogenic tank, comprising a compressor arranged downstream of a downstream valve, said compressor being active at an end of an emptying phase to bring the pressure in the temporary storage tank to a value lower than a lowest value of the pressure in the front cryogenic tank and in the rear cryogenic tank, and a pressure regulator arranged downstream of the downstream valve, said pressure regulator being active at a start of the emptying phase to bring the pressure of the gas at an outlet to a value lower than the pressure in the temporary storage tank.

10. The device according to claim 9, wherein each of the cryogenic tanks is designed for an operating pressure of less than 8 bars and the temporary storage tank is designed for an operating pressure of more than 500 bars.

11. The device according to claim 9, wherein each cryogenic tank is super-insulated under vacuum against conduction, convection and radiation.

12. The device according to claim 9, provided with the front cryogenic tank and the rear cryogenic tank, in an elongated shape along a common axis.

13. The device according to claim 9, comprising at least two front cryogenic tanks and at least two rear cryogenic tanks, which are spherical in shape.

14. The device according to claim 9, comprising a plurality of temporary storage tanks each arranged between two cryogenic tanks.

15. The device according to claim 9, wherein the temporary storage tank forms a gasification member, an upstream valve being provided to be open for liquid to flow through during a filling phase of the temporary storage tank and closed outside of the filling phase, a downstream valve being provided to be open for gas to flow through during an emptying phase of the temporary storage tank and closed outside the emptying phase, the upstream valve and the downstream valve being closed during a gasification phase.

* * * * *